2 Sheets—Sheet 1.

J. H. PHIPPS.

Type Writer.

No. 9,690. Reissued May 3, 1881.

WITNESSES.

S. Evans Thomas.

Frederic O. Paige.

INVENTOR.

Joseph H. Phipps.

By Wm. M. Leggett.

ATTORNEY.

J. H. PHIPPS.

Type Writer.

No. 9,690. Reissued May 3, 1881.

WITNESSES.

S. Evans Thomas,

Frederic O. Paige.

INVENTOR.

Joseph H. Phipps.

By Miles W. Leggett

ATTORNEY.

UNITED STATES PATENT OFFICE.

JOSEPH H. PHIPPS, OF FENTON, MICHIGAN.

TYPE-WRITER.

SPECIFICATION forming part of Reissued Letters Patent No. 9,690, dated May 3, 1881.

Original No. 229,458, dated June 29, 1880. Application for reissue filed September 14, 1880.

*To all whom it may concern:*

Be it known that I, JOSEPH H. PHIPPS, of Fenton, in the county of Genesee, and in the State of Michigan, have invented certain new and useful Improvements in Type-Writing Machines; and I do hereby declare that the following is a full, clear, and exact description thereof, reference being had to the accompanying drawings, and to the letters of reference marked thereon, making a part of this specification.

The nature of my invention consists in certain improvements in type-writers, as will be hereinafter more fully set forth, and pointed out in the claims; and more especially in providing a type-writer with key-levers, which are pivoted at their outer ends; also, in providing a shield to cover the outer pivoted ends of the lever, and extending a greater or less distance over the levers toward the keys; also, in providing a type-lever with a conical projection near its pivoted point, adapted to enter a suitable orifice and thereby guide the lever, so as to cause the type to register accurately upon the paper; also, in providing a type-lever with such a conical projection upon a short arm of the lever, the fulcrum being on the line of the lever between the conical projections and the type.

Figure 1:
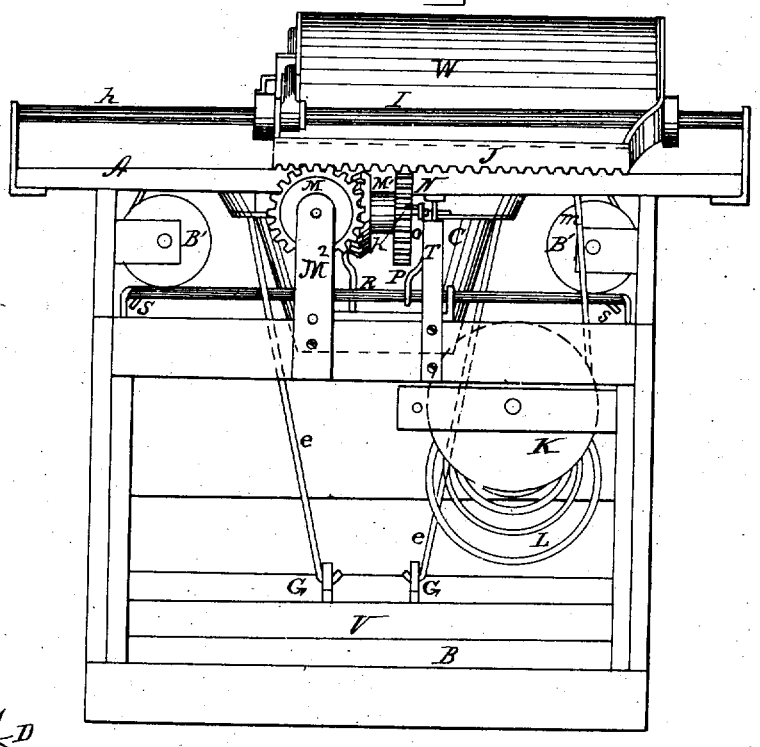
Figure 1:
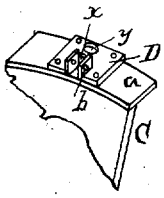
Figure 3:
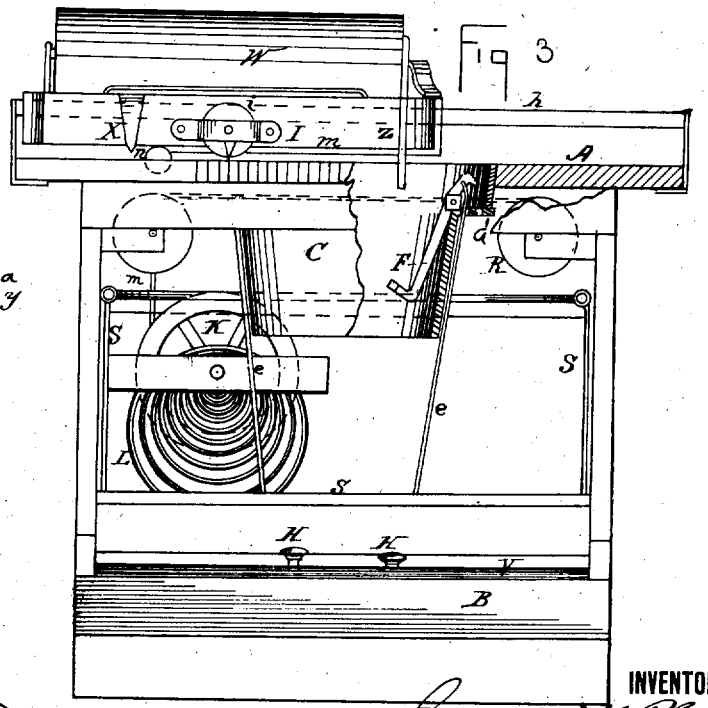
Figure 4:
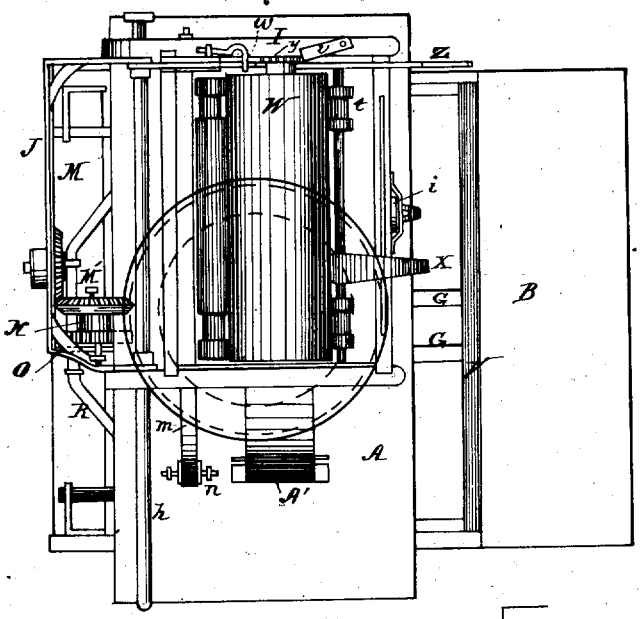
Figure 2:
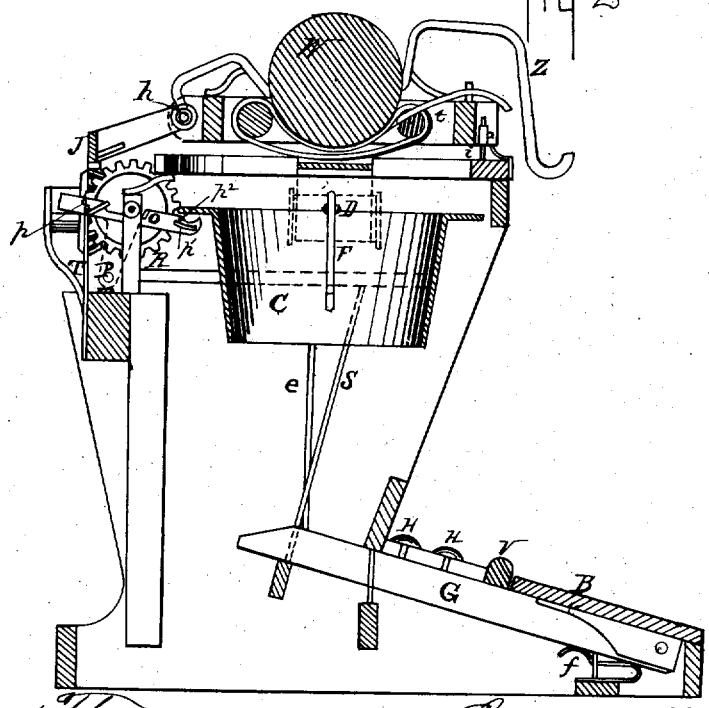

In the annexed drawings, Figure 1 is a rear elevation of a type-writer embodying my invention. Fig. 2 is a transverse vertical section; Fig. 3, a front elevation, partly in section; Fig. 4, a plan view of the same; and Fig. 5 is a perspective view of one of the type-lever guides made in two forms.

A represents the table of the machine, supported on a suitable frame, at the bottom of which is a platform, B, for the operator. In the table A is a circular opening, below which is secured a tapering rim, C, having a flange, *a*, around its upper edge. In this flange are arranged the type-lever guides D, one for each lever F.

Figure 5:
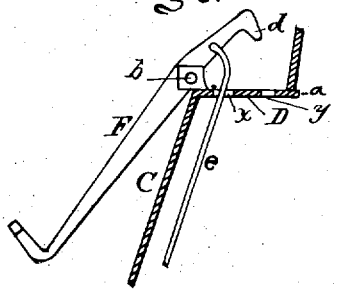

Fig. 5 shows two forms of the type-bar hanger and guide, in one of which the ears *b*, between which the bar F is pivoted, are shown applied directly upon the flange *a*, while in the other form shown a plate is provided with ears *b* and secured to the flange *a*.

The levers F are of substantially the form shown, pivoted between ears *b b* on the guides, and having the letters formed on their inner or lower bent ends. The shorter or upper arm of each lever is formed with a conical projection, *d*. Each guide D has two holes, *x* and *y*. The rod *c*, which connects the type-lever with its corresponding key-lever G, passes down through the hole *x* in the guide, while the hole *y* receives the cone *d* of the type-lever, for the double purpose of guiding the inner end of the lever to the exact spot where the impression is to be made, and also to form a stop for the lever.

The key-levers G are pivoted under the platform B, and each has a spring, *f*, under it for holding it up. These levers are all of the same length, and have the keys H placed at different positions on them—that is to say, at varying distances from their front ends.

Along the rear of the table A, and elevated above the same, is a rod, *h*, on which slides the carriage I, the front of said carriage being supported by a wheel or roller, *i*. The side arms of the carriage, when the rod *h* passes through them, are provided with sleeves or hubs, on which is hung a rack-frame, J. From the carriage I a strap, *m*, extends over a roller, *n*, down through a slot in the table, and connects below the same with a drum, K, to which a coil-spring, L, is connected in such a manner that by moving the carriage to the right the drum will be turned so as to wind up the spring, and the unwinding of the spring will move the carriage to the left again. The rack J meshes with a bevel-gear wheel, M, and this, in turn, meshes with a similar wheel, M′, on the hub of which is secured an escapement-wheel, N.

O is a sliding bar or escapement-bar, provided with one pin or projection, *p*, and a dog, *p′*, to take into the wheel N. The bar O is attached to an arm, P, projecting from a rocking shaft, R. The ends of this shaft form cranks, which, by rods or wires *s s*, connect with a bar, S, under the inner ends of the key-levers G, so that the depression of any one of these levers will operate the escapement. The pin *p* at the outer end of the escapement-bar O is stationary, while the dog *p′* at the inner end is pivoted, and a stop, $p^2$, on the bar limits the upward movement of the dog. A spring, T, is arranged to hold the bar O so that the dog *p′* will be in mesh with the escapement-wheel N.

By raising the rack J the carriage may be moved by hand to the right for printing, which winds up the spring L, as above stated, and when the rack J is then let down in gear with the wheel M the carriage is held in this position by the escapement, as the strain on the wheel N holds the dog $p'$ against the stop $p^2$. When any key-lever is pressed down to print a letter the bar O is moved inward, the pin $p$ entering the wheel N before the dog $p'$ has escaped; but as soon as this dog gets out of the wheel it drops down a certain distance or just below the tooth which bore against it. As the key-lever is then allowed to move up again the spring T throws the bar O outward again, and the strain caused by the spring L and rack J on the wheels causes the wheel N to turn just far enough to allow the dog $p'$ to enter the next space, and the next tooth throws the dog against the stop $p^2$. The carriage thus moves toward the left the distance of one of the teeth of the wheel N for each depression of a key-lever. A pivoted frame, V, is also provided to act on the bar S when the carriage should be moved without printing.

The carriage I contains the roller W and bands $t$ for holding the paper. At one end of the roller is a ratchet-wheel, Y, with a stationary pawl, $v$, to prevent backward movement thereof.

Z is a lever pivoted to the carriage and provided with a spring-pawl, $w$, to take into the ratchet Y. By depressing the lever Z the roller will be turned the required distance for the next line, and then the carriage can, by the aid of said lever, be moved to the right again. A spring is arranged to hold the pawl $w$ in the ratchet Y, and another spring is arranged to raise the lever Z.

On a rod in front on the carriage is a movable indicator, X, to indicate where to commence a line by moving the same to the right position on the paper, and then moving the carriage so that the indicator will be opposite the center of the machine. This movable indicator is used, in connection with a scale on the front of the machine, to perform the function for which it is designed.

A′ is an ink-ribbon, passing over rollers B′ B′.

By thus pivoting the key-levers at their outer ends, the machine is shortened and the pressure is applied nearer to the types, and the key being between the fulcrum and the attachment to the type-lever, the motion of the key necessary to throw the type is much reduced.

The platform B is immovable, and the outer ends of the key-levers being under said platform, they will be protected against accidental pressure while the operator rests his hand upon the platform or rest and depresses the key-levers by pressing with his fingers upon the keys.

Having thus fully described my invention, what I claim as new, and desire to secure by Letters Patent, is—

1. The combination, in a type-writer, of the type-lever, provided with a conical projection adjacent to its pivotal point, with the guide provided with the hole into which said projection upon the type-lever enters as said lever is actuated by the key-lever, substantially as and for the purpose described.

2. The type-lever guide D, formed with the ears $b$ $b$ and holes $x$ $y$, in combination with the type-lever F, formed with the cone $d$, substantially as and for the purposes herein set forth.

3. The combination, with the carriage I and its operating-spring connected directly to the carriage, as described, of the rack J, gear-wheels M M′, escapement-wheel N, and the escapement-bar O, having stationary pin $p$, pivoted dog $p'$, and stop $p^2$, the said pin and dog being arranged to operate on opposite teeth of the escapement-wheel, substantially as described.

4. The combination, with the escapement-wheel N and escapement-bar O, with its pin and dog operating on opposite teeth of the escapement-wheel, as herein described, of the spring T, rock-shaft R, rods $s$, bar S, key-levers G, and frame V, substantially as described.

5. In a type-writing machine, the combination of a movable indicator, X, on the front of the carriage and a scale on the front of the machine, substantially as described.

6. In a type-writer provided with keys located upon the key-levers at a point between the fulcrum and the point of attachment to the type-levers or connecting-rods, the combination, with the key-levers G, provided with buttons H, of the inclined hand-rest B, rigidly secured over the lower pivoted ends of the key-levers, said rest extending from their pivoted ends up to the hinged frame V, substantially as set forth.

7. In a type-writer, key-levers hinged at their extremities adjacent to the operator, and provided with keys located upon the key-levers at a point between the fulcrum and the point of attachment to the type-levers or connecting-rods, in combination with type-levers connected with said key-levers, and provided with types at their striking ends, substantially as described.

8. In a type-writer provided with keys located upon the key-levers at a point between the fulcrum and the point of attachment to the type-levers or connecting-rods, the combination, with the key-levers hinged at their ends adjacent to the operator, of a shield extending over the key-levers to a point in advance of the pivotal points, substantially as described.

In testimony whereof I hereunto attach my signature in the presence of two witnesses.

JOSEPH H. PHIPPS.

Witnesses:
W. M. PORTER,
SAMUEL E. THOMAS.